Patented June 19, 1928.

1,673,985

UNITED STATES PATENT OFFICE.

JOHANN EDUARD MARWEDEL AND JOSEPH LOOSER, OF HONNINGEN-ON-THE-RHINE, GERMANY, ASSIGNORS TO THE FIRM RHENANIA-KUNHEIM VEREIN CHEMISCHER FABRIKEN A. G., OF BERLIN, GERMANY, A CORPORATION OF GERMANY.

PROCESS OF PURIFYING BARIUM CARBONATE.

No Drawing. Original application filed October 21, 1922, Serial No. 596,104, and in Germany January 4, 1922. Divided and this application filed December 2, 1926. Serial No. 152,297.

This invention relates to processes of purifying barium carbonate and it comprises the process in which barium carbonate containing small amounts of insoluble sulphur compounds is mixed with an alkali metal hydroxide or alkali metal hydroxide and alkali metal carbonate, the mixture heated to convert the insoluble sulphur compound into soluble sulphur compound, and the resulting product lixiviated or leached with water. The present application is a division of our copending case Ser. No. 596,104, now Patent No. 1,615,515.

In the production of barium carbonate from barium sulphate (heavy spar) by heating with coal, lixiviating of the thereby obtained product, and passing of carbon dioxide into the barium sulphide solution, the barium carbonate, which precipitates as a white precipitate, always contains sulphur as an impurity for instance barium thiosulphate and barium sulphide which partly adhere so strongly to the deposit, that they cannot be removed even by repeated washing with hot water. Owing to the presence of sulphur the barium carbonate is for many purposes unsatisfactory.

According to the present invention barium carbonate, which is practically free from sulphur as an impurity, is obtained by admixing to technical barium carbonate, produced in the usual manner by treating a solution of barium sulphide with carbon dioxide, alkali-metal hydroxides or alkali-metal hydroxides and alkali-metal carbonates and heating this mixture. The mixing of the impure barium carbonate with the alkali-metal hydroxides and alkali-metal carbonates is preferably carried out, when the precipitated and separated barium carbonate is still moist.

The heating of the mixture can be done for instance in a drying kiln, in a drying drum or in the autoclave. If the heating is done in the autoclave temperatures of for instance 120 to 200° C. have proved advantageous. In all cases products are obtained which, after lixiviation with water and drying, are indifferent to silver and come up to the highest exigencies of the industry. The quantity of the alkali-metal hydroxide or of the alkali-metal carbonate to be added depends on the percentage of sulphur of the barium carbonate and on the desired degree of purity of the final product. The degree of temperature is also of importance; if higher temperatures are used for instance less alkali-metal hydroxide or less alkali-metal carbonate will be required.

By the heating of the impure barium carbonate in mixture with alkali-metal hydroxide or alkali-metal hydroxide and alkali-metal carbonate the sulphur of the impurities is bound by these alkali-metal compounds, thereby producing easily soluble alkali-metal sulphur compounds, which are removed by lixiviation with water.

Examples.

1. 100 kilograms of a moist barium carbonate precipitated from barium sulphide solution of carbon dioxide and containing 2.50% of sulphur compounds (calculated as $BaSO_4$) are mixed with 10 kilograms of sodium hydroxide and heated in the autoclave at temperatures over 120° C. for one to two hours. After lixiviation the barium carbonate showed only 0.03% of sulphur compounds.

2. With an addition of only 2.5 kilograms of sodium hydroxide and of 7.5 kilograms of sodium carbonate the barium carbonate contained 0.07% of sulphur compounds.

We claim:

1. The process of purifying impure barium carbonate containing small amounts of insoluble sulphur compounds which comprises mixing the impure barium carbonate with an alkali metal hydroxide and heating the mixture.

2. The process of purifying impure barium carbonate containing small amounts of insoluble sulphur compounds which comprises mixing the impure barium carbonate with an alkali metal hydroxide and an alkali metal carbonate and heating the mixture.

3. The process of purifying impure barium carbonate containing small amounts of insoluble sulphur compounds which comprises mixing the impure barium carbonate with an alkali metal hydroxide, heating the mixture and thereafter leaching the mixture with water to remove soluble sulphur compounds.

4. The process of purifying impure barium carbonate containing small amounts of insoluble sulphur compounds which comprises mixing the impure barium carbonate with an alkali metal hydroxide and an alkali metal carbonate, heating the mixture and thereafter leaching the mixture with water to remove soluble sulphur compounds.

In testimony whereof we affix our signatures.

JOHANN EDUARD MARWEDEL.
JOSEPH LOOSER.